Jan. 25, 1955    L. REGIMBAL ET AL    2,700,452
CARRIER SYSTEM FOR HOP VINES

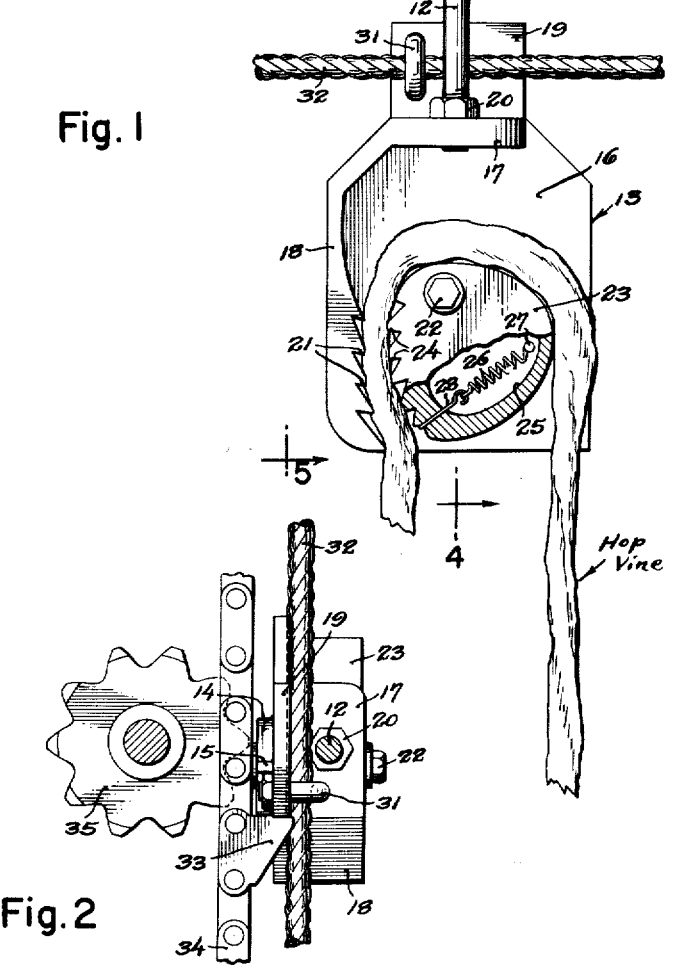

Original Filed May 6, 1950    2 Sheets-Sheet 2

INVENTOR.
Laurent Regimbal
Fred Thurmer

United States Patent Office 2,700,452
Patented Jan. 25, 1955

2,700,452

CARRIER SYSTEM FOR HOP VINES

Laurent Regimbal, Toppenish, and Fred Thurmer, Yakima, Wash.

Original application May 6, 1950, Serial No. 162,173. Divided and this application September 18, 1951, Serial No. 247,112

6 Claims. (Cl. 198—179)

This invention relates to a carrier system and the present application is a division of our pending application to Machine for Stripping Hop Vines, Ser. No. 162,173, filed May 16, 1950, wherein the system is shown as giving overhead support to a hanging hop vine and functions to convey the vine through a picking throat of V-shaped plan configuration flanked at opposite sides by a series of downwardly moving picking fingers. While the system perhaps finds its greatest usefulness in the handling of hop vines, and peculiarly lends itself to use with a hop-picking machine of the particular nature illustrated and described in our above-identified pending application, the same could be used to advantage in the handling of applicable objects other than hop vines.

Clarity in an understanding of the invention will probably be advanced, however, if it is here assumed that the object to be carried is a hop vine, and that it is required to suspend this hop vine from an overhead carrier and convey the same along a given travel path so as to bring the hanging portion of the vine, in course of such travel, under the influence of picking fingers which operate downwardly along the length of the vine. Realizing that these fingers exert a very considerable pull force upon the vine, a practical carrier must needs incorporate vine-gripping devices which will effectively withstand this pull. In a carrier system for hop vines it also becomes desirable that the vines be easily disconnected from the gripping devices after the vine has been divested of its foliage.

Having the foregoing in mind it is an important object of the present invention to provide, for the carrier devices of the system, a jawed grasper block which will securely grip the butt end of a hop vine.

It is a further and particular object to devise a jawed grasper block which enables the hop vine to be applied thereto with unusual ease and expedition, and which is peculiarized in that the pendant weight of the hop vine is relied upon to cause the jaws of the block to firmly grip the vine.

As a further object still, the invention aims to provide means associated with the carriers and functional upon the grasper blocks as the latter progress to a given point along the travel path of the carriers to cause said gripped vines to be automatically freed from the grasper blocks.

Other more particular objects and advantages will, with the foregoing, appear and be understood in the course of the following description and claims, the invention consisting in the novel construction and in the adaptation and combination of parts hereinafter described and claimed.

In the accompanying drawings:

Figure 1 is a side elevational view, with parts in section, illustrating a fragmentary portion of a carrier system embodying the preferred teachings of the present invention.

Fig. 2 is a horizontal sectional view thereof. The line on which this section is taken is shown at 2—2 in Fig. 5.

Figure 3:
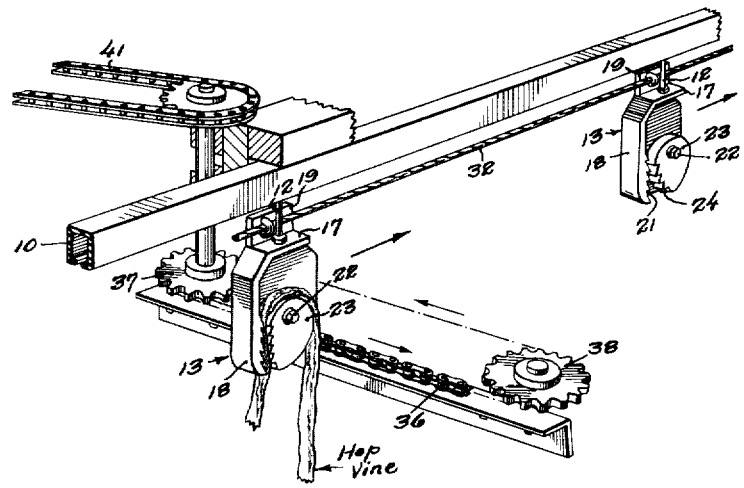
Fig. 3 is a fragmentary perspective view illustrating another portion of the carrier system.
Figure 4:
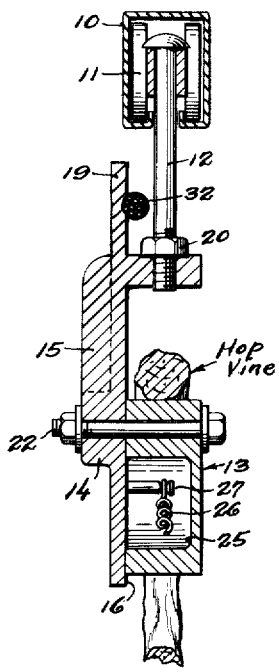
Fig. 4 is a transverse vertical section on line 4—4 of Fig. 1.
Figure 5:
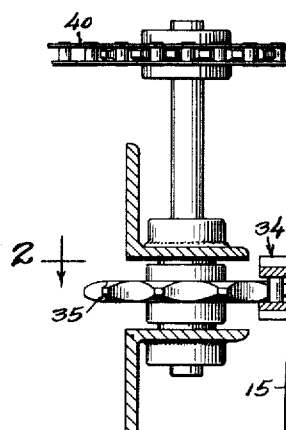
Fig. 5 is a transverse vertical section on line 5—5 of Fig. 1.

The present conveyor system employs a track designated by the numeral 10, and we prefer to use a track of the inverted U sectional shape commonly known as barn-door channel stock. While not shown in the present drawings, the track desirably is endless, extends more or less horizontally, and traces an approximately rectangular pattern with the sides and ends connecting by gradual bends, all of which will be apparent from an inspection of our above-identified parent application. A plurality of trolley-carriages 11 ride along the track, and depending from each of the carriages is a hanger-bolt 12. The grasper blocks of the present invention, designated generally by the numeral 13, are rigidly secured to the exposed lower ends of these hanger-bolts.

Made as a special casting, the blocks are shown as providing a plate-like body principal thickened at the back by a boss 14 and a vertical reinforcing rib 15, and having at the front a flat face 16 bordered along the top and one side edge by a web 17 and a flange 18, respectively, the web and flange being continuous. The block also presents an ear 19 extending upwardly beyond the web as a co-planar prolongation of the body principal. In connecting the block to the hanger-bolt the lower end of the latter threads into the web 17 and is fixedly secured by a locking nut 20. The flange 18 serves the function of a stationary jaw and will be hereinafter so termed, and to perform its gripping office is provided upon the inside face with a series of downwardly pointing ratchet-like teeth 21.

Piercing the block on the axial center of the boss is a transverse opening through which there is received an axle-bolt 22, and serving as the movable complement of said stationary jaw 18 there is pivoted on such axle-bolt a hollow drum 23 having in its periphery a series of ratchet-like teeth 24 opposed to the teeth of the stationary jaw. The pivotal axis of the drum is by preference placed eccentric to the perimeter with the greater radii lying below the pivot and also to the side opposite the teeth. In its operation the drum suggests a revolving lever of the first order using, as a turning force, weight of gravitation applied on a line tangent to the smooth face and with resistance being imposed by an object clamped between the jaws, and considered in respect of the block's directional travel the mounting of the drum upon the block is desirably such that the arm of the lever which is subjected to said weight of gravitation lies to the front. The cavity 25 provided within the drum is open to the back side, and housed within the cavity is an extension spring 26 having one end 27 anchored to the body principal and having the other end 28 so attached to the drum as to normally effectuate a jaw-opening movement of the latter. Where the drum, as here shown, is mounted upon the right or starboard side of the block body, this opening movement is perforce counter-clockwise as viewed from the vantage point of Fig. 1.

The procedure, in applying a hop vine to the grasper block, is to bend the butt end of the vine and loop this bend over the rim of the drum with the short end disposed between the open jaws. The movable jaw is then pressed inwardly to initiate a bite upon such short end. The pendant weight of the long or foilage-carrying end of the vine then takes over and transmits through the loop to the short end of the vine an upward pull which acts to tighten the jaws upon the vine. Hop-stripping devices working from below upon the suspended long end of the vine may safely exert almost unlimited pull force without liability of dislodging the gripped butt in that the gripping force of the jaws increases with increasing pull upon the vine's long end.

The upstanding ear 19 of our block has a horizontally extending shallow groove provided in one of the facing sides thereof. Seated in this groove and clamped to the ear by a shackle-bolt 31 is an endless cable 32 having an over-all length approximating the length of the track 10. It is the function of this cable to connect a plurality of the grasper blocks in an endless chain and, by force of travelling energy which may be applied to the cable but which we prefer to impart directly to one or more of the blocks in the chain, cause the blocks to move in concert along a defined travel path which the guided movement of the trolley-carriage prescribe. The travelling energy is applied to the back edge of the ear 19 from vertically spaced sets of legs or flights 33 carried by separated links of an endless power-driven horizontal chain 34. The chain is trained about sprocket wheels 35, and while these sprocket wheels feasibly might be so located as to position the chain at any described point within the travel path of the conveyed blocks, the same desirably are positioned in the manner which we illustrate in our above-identified parent application, and namely such that a working run of the chain lies below and to the inside of the track paralleling one of the corner bends of the latter.

A particular feature of our grasper-block is that the jaws admit of being disengaged from the vine simply by slipping the bight of the vine off the rim of the drum 23 so that the gravitational pull of the vine's long end will then shift from one to the other side of the pivot axis and responsively open the jaws. The present invention provides a means by which this action of slipping the free end of the bight laterally is accomplished automatically as the conveyed grasper blocks traverse a given zone in the course of their endless travel. The concerned means is detailed in Fig. 3 and comprises an endless chain 36 extending transverse to the track and trained about driving and idler sprocket wheels 37 and 38, respectively, for movement in an approximately horizontal plane located somewhat below the path of the travelling grasper blocks. The run of the chain which lies proximal to the approaching blocks travels in a direction outwardly from the drum-carrying face 16 of the block, and as the hanging long end of a conveyed vine is brought into contact with such proximal run the vine is caught by a link of the chain and swung laterally outwardly from its normal free-hanging perpendicular position. A swing movement of comparatively little magnitude is found to be sufficient to slip the free end of the vine's bight off the rim of the drum, whereupon the weight center of the vine shifts to the back edge of the drum. This shift of weight is self-sufficient to open the jaws and free the vine, the spring 26 serving only to normally hold the jaws open in order to facilitate the work of loading each grasper-block with a foliage-carrying hop vine as the block reaches a loading platform (not shown) in its continuing travel beyond the unloading chain 36. We find that the links of an ordinary sprocket chain are self-sufficient to present a shoulder of ample prominence to obtain an effective purchase from the unloading chain upon the hanging long end of the vine, and which is to say that it is unnecessary to employ a chain on which special lugs or other projections are provided at spaced intervals of the length. However, a chain of this nature could, perforce, be employed if a more positive purchase is deemed desirable. The chains 34 and 36 are powered in any suitable manner. We illustrate, for this purpose, driving chains 40 and 41, respectively.

It is thought that the invention and the manner of its usage will have been clearly understood from the foregoing detailed description of our illustrated now-preferred embodiment. The conveyor system self-evidently admits of being used to handle any load having a stem-like appendage capable of being bent so as to provide a bight and we intend that the term "hop vine" be given this liberal meaning in each instance of its occurrence throughout the description and claims. It is furthermore apparent that minor changes in the details of construction can be resorted to without departing from the spirit of the invention, wherefore we also intend that no structural limitations be implied and that the hereto annexed claims be given the broadest interpretation to which the employed language fairly admits.

What we claim is:

1. Means for suspending a hop vine comprising a grasper block presenting opposed jaws at least one of which is journaled to pivot about a horizontal axis and provides a crowning rim surface serving as a seat for the bight formed by looping an end of the vine, the pivot mounting being such as causes the jaw to responsively swing into a jaw-closing position by the pull force of the long end of the vine when said bight is looped over the rim with the short extremity of the vine caught between the jaws, means being provided exerting a constant yielding force upon the movable jaw urging said movable jaw into open position.

2. Means for suspending a hop vine comprising a grasper block presenting opposed jaws at least one of which is eccentrically journaled to pivot about a horizontal axis and provides a crowning rim surface serving as a seat for the bight produced by bending the terminal portion of a hop vine into a loop, the eccentric pivoting of the jaw being such as causes the jaw to swing into jaw-closing position by pull force exerted from the long end of the vine when said produced bight is looped over the rim with the short extremity of the vine caught between the jaws, means being provided exerting a constant yielding force upon the movable jaw urging said movable jaw into open position.

3. In combination: a block for grasping hop vines providing complementary jaws at least one of which is pivotally mounted to swing upwardly into and downwardly out of a jaw-closing position, and having support means associated with and disposed in overhead relation to the jaws and adapted to have the butt end of a hop vine looped thereover so as to locate the short end in a position whereat the same lies between the jaws and with the long end hanging free, the upward pull transmitted to the short end of the looped vine by the hanging weight of the long end acting by frictional engagement with the pivoted jaw to tighten the latter upon said short end of the vine, the jaws being opened by the act of slipping the bight of the loop off said overhead support means so that the weight of the long end then exerts a downward pull upon the short gripped end of the vine, means being provided exerting upon such pivoted jaw a constant force yieldingly urging the same directively from said jaw-closing position, a conveyor for moving the block along a predetermined path, and means occupying a position along the path travelled by the conveyor block for slipping the bight of the loop off said overhead support means.

4. In combination: a block for grasping hop vines providing complementary jaws at least one of which is pivotally mounted to swing upwardly into and downwardly out of a jaw-closing position, and having support means associated with and disposed in overhead relation to the jaws and adapted to have the butt end of a hop vine looped thereover so as to locate the short end in a position whereat the same depends between the jaws and with the long end hanging free, the upward pull transmitted to the short end of the looped vine by the hanging weigth of the long end acting by frictional engagement with the pivoted jaw to tighten the latter upon said short end of the vine, the jaws being opened by the act of slipping the bight of the loop off said overhead means so that the weight of the long end then exerts a downward pull upon the short gripped end of the vine, a conveyor for moving the block along a predetermined path with the directional travel such that the long end of the vine lies to the front and the short gripped end lies to the rear, and means for unloading the block placed to occupy an interruptive position in the travel path of said leading long end of the vine and acting upon said long end to move the same laterally outwardly so as to cause the bight to be slipped off of the overhead support means.

5. Structure according to claim 4 in which the unloading means comprises a horizontally disposed endless chain trained about sprocket wheels journaled to turn about vertical axes and powered so as to give the run of the chain which lies nearest the approaching grasper block a movement laterally outwardly with respect to the block.

6. In combination: a block for grasping hop vines providing complementary jaws at least one of which is pivotally mounted to swing upwardly into and downwardly out of a jaw-closing position, and having support means associated with and disposed in overhead relation to the jaws and adapted to have the butt end of a hop vine looped thereover so as to locate the short end in a position whereat the same depends between the jaws and with the long end hanging free, the upward pull transmitted to the short end of the looped vine by the hanging weight of the long end acting by frictional engagement with the pivoted jaw to tighten the latter upon said short end of the vine, the jaws being opened by the act of slipping the bight of the loop off said overhead means so that the weight of the long end of the vine then exerts a downward pull upon the short gripped end of the vine, a conveyor for moving the block along a predetermined path, and means occupying a position along the path travelled by the conveyor block for slipping the bight of the loop off said overhead support means.

References Cited in the file of this patent

UNITED STATES PATENTS

| | | |
|---|---|---|
| 1,008,914 | Horst | Nov. 14, 1911 |
| 1,581,526 | Willsea | Apr. 20, 1926 |
| 2,193,354 | Thys | Mar. 12, 1940 |
| 2,391,138 | Dauenhauer | Dec. 18, 1945 |
| 2,496,858 | Crowley | Feb. 7, 1950 |